(12) United States Patent
Wu

(10) Patent No.: US 7,904,363 B2
(45) Date of Patent: Mar. 8, 2011

(54) DATABASE FOR FINANCIAL MARKET DATA STORAGE AND RETRIEVAL

(75) Inventor: Shao Ai Wu, Brooklyn, NY (US)

(73) Assignee: Morgan Stanley, New York, NY (US)

( * ) Notice: Subject to any disclaimer, the term of this patent is extended or adjusted under 35 U.S.C. 154(b) by 100 days.

(21) Appl. No.: 12/236,915

(22) Filed: Sep. 24, 2008

(65) Prior Publication Data

US 2010/0082417 A1    Apr. 1, 2010

(51) Int. Cl.
*G06Q 40/00* (2006.01)
(52) U.S. Cl. .............................................. 705/35; 705/40
(58) Field of Classification Search ............... 705/10–44
See application file for complete search history.

(56) References Cited

U.S. PATENT DOCUMENTS

| | | | |
|---|---|---|---|
| 5,006,992 A | | 4/1991 | Skeirik |
| 5,220,500 A | | 6/1993 | Baird et al. |
| 5,590,325 A | | 12/1996 | Kolton et al. |
| 5,857,182 A | | 1/1999 | DeMichiel et al. |
| 5,987,432 A | * | 11/1999 | Zusman et al. ............... 705/35 |
| 5,987,468 A | | 11/1999 | Singh et al. |
| 6,360,188 B1 | | 3/2002 | Freidman et al. |
| 6,513,019 B2 | | 1/2003 | Lewis |
| 6,735,580 B1 | | 5/2004 | Li et al. |
| 7,069,514 B2 | | 6/2006 | DeMesa et al. |
| 7,081,095 B2 | | 7/2006 | Lynn et al. |
| 7,149,716 B2 | | 12/2006 | Gatto |
| 7,212,997 B1 | | 5/2007 | Pine et al |
| 7,249,328 B1 | | 7/2007 | Davis |
| 7,305,362 B2 | | 12/2007 | Weber et al. |
| 7,310,615 B2 | | 12/2007 | Lewis |
| 7,369,961 B2 | | 5/2008 | Castelli et al. |
| 2002/0065752 A1 | | 5/2002 | Lewis |

(Continued)

FOREIGN PATENT DOCUMENTS

WO    WO 01/55930 A2    8/2001

(Continued)

OTHER PUBLICATIONS

Hee-Joon Ahn et al., "Tick Size, Spread and Volume", Journal of Financial Intermediation 5, 2-22 (1996) Article No. 0002, received Jan. 17, 1995; accepted Oct. 31, 1995.*

(Continued)

*Primary Examiner* — Frantzy Poinvil
(74) *Attorney, Agent, or Firm* — K&L Gates LLP

(57) ABSTRACT

A multi-session write-once computer tick database operable to store financial market data or "tick data." The tick database stores market information regarding discrete market transactions in individual ticks. For example, information related to stock trades, and quotes may be stored in the database. The individual ticks vary in length dependent on the information available regarding the particular transaction. Null values are not stored in the database. Various field identifiers may be stored in the tick to identify the various metrics or parameters relevant to the transaction that are also stored in the tick. In various embodiments, one metric or parameter is associated with each field identifier. Different transactions may have different number of field identifiers stored within the tick, accordingly, different ticks may differ in length. The information stored within the ticks may be subsequently retrieved. When market data is retrieved using the embedded three-part hierarchal key structure, it may be stored in a cache associated with the tick database. The stored market data may be retrieved from the cache during subsequent requests.

30 Claims, 12 Drawing Sheets

U.S. PATENT DOCUMENTS

| | | |
|---|---|---|
| 2002/0111891 A1 | 8/2002 | Hoffman et al. |
| 2002/0112056 A1 | 8/2002 | Baldwin et al. |
| 2002/0184133 A1 | 12/2002 | Zangari et al. |
| 2003/0009419 A1 | 1/2003 | Chavez et al. |
| 2003/0110124 A1 | 6/2003 | Escher |
| 2003/0115128 A1 | 6/2003 | Lange et al. |
| 2004/0148247 A1 | 7/2004 | Miller et al. |
| 2004/0162772 A1 | 8/2004 | Lewis |
| 2006/0206357 A1 | 9/2006 | Boardman et al. |
| 2007/0143198 A1 | 6/2007 | Brandes et al. |
| 2008/0069141 A1 | 3/2008 | Bonaguro et al. |

FOREIGN PATENT DOCUMENTS

| | | |
|---|---|---|
| WO | WO 02/01395 A1 | 1/2002 |

OTHER PUBLICATIONS

Informix TimeSeries DataBlade Module—User's Guide, Version 4.0, Aug. 2000, 544 pages.

IBM Informix TimeSeries Real-Time Loader—User's Guide, Version 1.10, Aug. 2002, 134 pages.

\* cited by examiner

| fid_num | fid_sym | type_id | size | Description |
|---|---|---|---|---|
| 0 | nts | uint | 4 | Receive_Time_Stamp |
| 1 | tp | double | 8 | Trade_Price |
| 2 | tt | time_sec | 4 | Trade_Time |
| 3 | ts | uint | 4 | Trade_Size |
| 4 | tc | uint | 4 | Trade_Condition |
| 5 | ap | double | 8 | Ask_Price |
| 6 | at | time_sec | 4 | Ask_Time |
| 7 | as | uint | 4 | Ask_Size |
| 8 | bp | double | 8 | Bid_Price |
| 9 | bt | time_sec | 4 | Bid_Time |
| 10 | bs | uint | 4 | Bid_Size |
| 11 | vs | uint | 4 | Volume |
| 12 | itp | double | 8 | Irregular_Trade_Price |
| 13 | its | uint | 4 | Irregular_Trade_Size |
| 14 | ctp | double | 8 | Corrected_Trade_Price |
| 15 | cts | uint | 4 | Corrected_Trade_Size |
| 16 | pq2 | uint | 4 | Price_Qualifier_2 |
| 17 | to | double | 8 | Turnover |
| 18 | ttl | time_sec | 4 | Trade_Time_1 |
| 19 | msg | ushort | 2 | IDN_Message_Type |
| 20 | pq1 | uint | 4 | Price_Qualifier_1 |
| 21 | cc | string | 3 | Condition_Code |

Figure 3B

| 22 | te | string | 3 | Trade_Exchange |
| --- | --- | --- | --- | --- |
| 23 | pal | double | 8 | Primact_1 |
| 24 | afl | string | 1 | Act_Flag_1 |
| 25 | mm | string | 4 | Market_Maker_Id |
| 26 | gv1 | double | 8 | General_Value_1 |
| 27 | gv2 | double | 8 | General_Value_2 |
| 28 | gv3 | double | 8 | General_Value_3 |
| 29 | gv4 | double | 8 | General_Value_4 |
| 30 | gv1t | string | 6 | General_Value_1_Text |
| 31 | gv2t | string | 6 | General_Value_2_Text |
| 32 | gv3t | string | 6 | General_Value_3_Text |
| 33 | gv4t | string | 6 | General_Value_4_Text |
| 34 | svs1 | uint | 4 | Secondary_Volume_1 |
| 35 | vst1 | string | 2 | Secondary_Volume_Type_1 |
| 36 | seq | uint | 4 | Sequence_Number |
| 37 | oseq | uint | 4 | Original_Sequence_Number |
| 38 | ctq | string | 3 | CTS_Qualifier |
| 39 | imb | uint | 4 | Order_Imbalance |
| 40 | imbs | string | 4 | Order_Imbalance_Side |
| 41 | imbt | time_sec | 4 | Order_Imbalance_Time |
| 42 | bkstat | string | 3 | Book_Status |
| 43 | Xxt | hhmmss | 4 | Transmit_Time |
| 44 | rcvt | uint | 4 | Receipt_Time |
| 45 | Xdstt | uint | 4 | Distribution_Time |

Figure 3B (cont.)

| 46 | sq | uint | 4 | Sequence_Number |
| --- | --- | --- | --- | --- |
| 47 | pbck | uint | 4 | Original_Sequence_Number |
| 48 | xtp | double | 8 | Original_Trade_Price |
| 49 | xts | uint | 4 | Original_Trade_Size |
| 50 | xtc | uint | 4 | Original_Trade_Condition |
| 51 | ctc | uint | 4 | Corrected_Trade_Condition |
| 52 | itc | uint | 4 | Irregular_Trade_Condition |
| 53 | et | hhmmss | 4 | Exchange_Time |
| 54 | aqc | string | 7 | Ask_Quote_Condition |
| 55 | bqc | string | 7 | Bid_Quote_Condition |
| 56 | th | string | 2 | Trading_Halt |
| 57 | ae | string | 1 | Ask_Exchange |
| 58 | be | string | 1 | Bid_Exchange |
| 59 | ddir | string | 1 | Trade_Direction |
| 60 | thty | string | 3 | Trading_Halt_Type |
| 61 | tht | time sec | 4 | Trading_Halt_Time |

Figure 3B (cont.)

| type_id | Data type | Size | Notes |
|---|---|---|---|
| TYPE_UNKNOWN | | | Reserve for errors |
| TYPE_CHAR | char | 1 | ASCII character type |
| TYPE_WCHAR | wchar_t | 4 | Wide character (Unicode) |
| TYPE_INT8 | tiny_int | 1 | 1-byte unsigned integer |
| TYPE_INT16 | short | 2 | 2-byte integer |
| TYPE_UINT16 | unsigned short | 2 | 2-byte unsigned integer |
| TYPE_INT32 | int | 4 | 32-bit integer |
| TYPE_UINT32 | unsigned int | 4 | 32-bit unsigned integer |
| TYPE_INT64 | long integer | 8 | 64-bit integer |
| TYPE_UINT64 | unsigned long | 8 | 64-bit unsigned integer |
| TYPE_FLOAT | float | 4 | 32-bit floating point (IEEE 754 float) |
| TYPE_DOUBLE | double | 8 | 64-bit floating point (IEEE 754 double) |
| TYPE_DATE | date | 4 | 32-bit integer in the form of ccyymmdd. |
| TYPE_TIME32 | time_t | 4 | 32-bit Unix/POSIX time_t |
| TYPE_TYPE64 | time_t | 8 | 64-bit Unix/POSIX time_t |
| TYPE_TIMESTAMP | timestamp | 8 | 32-bit Unix/POSIX timeval structure |
| TYPE_TIMESTAMPx | timestamp | 16 | 64-bit Unix/POSIX timeval structure |
| TYPE_HHMMSS | seconds | 4 | 32-bit integer – number of seconds since beginning of the day. |
| TYPE_STRING | string | 0 – 255 | ASCII string. The smallest string is 1 byte long and the largest string is 254 bytes. We always store a NULL-character terminator at the end of the string. |
| TYPE_WSTRING | wstring | 0 – 255 | Wide character (Unicode) string data type. Size is number of characters in the string, not number of bytes in the string. |

Figure 3C

| STATUS | Note |
|---|---|
| DB_STAT_EMPTY | Empty – no data |
| DB_STAT_AVAIL | OK – available for queries |
| DB_STAT_LOADING | Loading data (run time state) |
| DB_STAT_INACTIVE | Inactive data – should not query |
| DB_STAT_INVALIDED | Invalidated data – something wrong don't use the data. |
| DB_STAT_SUSPECT | Suspect data |

DATABASE FOR FINANCIAL MARKET DATA STORAGE AND RETRIEVAL

BACKGROUND

Investment companies and brokerage houses typically store a tremendous amount of market data. Different database systems exist that can compile and aid one in searching through the historical stock market transactions. These systems permit, for example a financial analyst, to request the value of a particular stock on a particular date, or to request information related to sales on a particular exchange.

Traditionally, after the markets have closed for the day, data regarding the daily trading information is fed into databases administered by the various brokerage houses and investment companies. This market data regarding the transactions is often referred to as "tick data." The data in the database can then be used for analysis and calculations regarding the various transactions that occurred throughout the day or any other desired time period. Due to the incredibly large amounts of data accumulated on a daily basis, efficiency with regard to storage techniques and retrieval techniques is critical to these types of database systems.

Current systems for storing and retrieving this tick data, such as time series databases, relational databases, and specialized in-memory databases, have their downfalls. For example, some in-memory database systems require large amounts of Dynamic Random Access Memory (DRAM) in order to provide fast access to the data. Acquiring and maintaining the required memory space is often very costly, or impractical due to technological limitations. For example, storing tick data from an Options Price Reporting Authority (OPRA) feed using in-memory databases is not possible due to technological limitations and the data volume. As the amount of data regarding the daily market transactions continues to increase, the storage space (and cost) continues to increase as well. Additionally, database systems, such as relational databases or time-series databases, while not using high-cost DRAM for storage, do not allow for fast enough data retrieval functionality. These types of systems may also not be able to handle large volumes of new record insertions (inserted as rows) fast enough. With the increasing amount of data stored on a daily basis, the ability to quickly retrieve the requested data in such systems may decrease, thereby decreasing the functionality and usefulness of such data storage system.

Many of the existing specialized in-memory databases for storing market data rely on creating various types of data arrays for each transaction. For instance, multiple fields, each with data regarding a given financial instrument, may be stored in memory as an array. Each field in the array is designated to a particular type of data, such as trade price, quantity, or a time stamp. Record-based array implementations are typically inflexible with regard to adding more fields, such as columns, to an existing database. In vector-based in-memory database systems, each column is stored in its own individual array (i.e., a vector) and each array is stored in a separate file. Accordingly, a database table consisting of 60 columns would require over 60 loosely coupled files with this type, of implementation. In various in-memory database systems, a row or record may have dozens, or even hundreds, of different columns (fields) to hold the various types of data that may be available for each transaction. If data associated with a particular column is not available or not applicable for a particular transaction, however, a null value is typically placed in the column. In these systems, for any given transaction, a multitude of columns may have a plurality of null values. The entire array, including the null columns, is stored into memory. Thus, even though numerous columns with null values do not contain any "useful" data, the columns still consume memory space, which consumes resources and adds to data retrieval times. Current systems, such as time series databases, relational databases, or in-memory databases, require tick data to be normalized in this fashion.

SUMMARY

In one general aspect, the present invention is directed to a database system for storing massive amounts of financial market data for high speed data retrieval that consumes a relatively small amount of memory (such as dynamic random access memory) and disk storage. According to one embodiment, a computer receives the market data and a multi-session, write-once computer database operable with the computer stores the market data. In various embodiments, more data can be appended to the existing database while existing data can not be altered. In various embodiments, the market data comprises data regarding individual transactions for investment instruments, such as stocks, funds, currencies, bonds, or any other type of investment vehicle or instrument. The market data regarding the individual transactions for a particular one of the investment instruments may be stored in one of a plurality of ticks in the database, where there is one tick for each transaction. In various embodiments, each tick may comprise a plurality of fields, including at least one field identifier field and a value field associated with the at least one field identifier field. In some embodiments, there is one value field for each field identifier field in the tick, wherein the ticks have a variable number of fields, including a variable number of field identifier fields, depending on the received market data. That way, for example, the database does not need to store null data; only "real" data needs to be stored. Further, using variable length ticks for each transaction accounts for the fact that each transaction may have a different amount of relevant market data.

According to some embodiments, the data in the database may be retrieved using at least a three-part hierarchal key. The three-part hierarchal key may comprise, for example, a date, an exchange, and an investment vehicle symbol (or other identifier). In various embodiments, the database may also comprise a schema, a date table, an exchange table, and a ticker table. Furthermore, the database may comprise a tick stack, the tick stack comprised of a plurality of individual variably sized ticks. The storage and retrieval techniques allow for efficient use of storage space and quick data retrieval speed. Using the hierarchal key structure, certain requests may be achieved without expensive table jointing required by other types of databases, such as relational databases.

These and other benefits of the present invention will be apparent from the description that follows.

FIGURES

Various embodiments of the present invention are described herein by way of example in conjunction with the following figures, wherein:

FIG. 3B shows a populated schema according to various embodiments of the present invention;

FIG. 3C shows a table with data type definitions according to various embodiments of the present invention;

DESCRIPTION

In one general aspect, the present invention is directed to computer-implemented database system that provides storage and retrieval access for financial market data or "tick data". Tick data refers generally to quote and trade data associated with trades or transactions involving equity, fixed-income, financial derivatives, bonds, commodities, currency, or other type of investment instruments or investment vehicles. The term tick data traditionally includes, but is not limited to, numerical price and trade data reported from trading venues, such as various domestic and international stock exchanges. For example, for any particular trade transaction the tick data may include a variety of information regarding a transaction, such as a time stamp, trade size, trade price, or trade condition code. For various other types of transactions (such as quotes, calls, or asks, for example) the tick data may include other information, such as an bid price, ask price, bid size, ask size, and/or other pieces of information. As may be appreciated by those skilled in the art, the tick data may also include trade conditions (such as corrections and cancellations), quote conditions, and market conditions (such as trade halts, for example).

Figure 1:
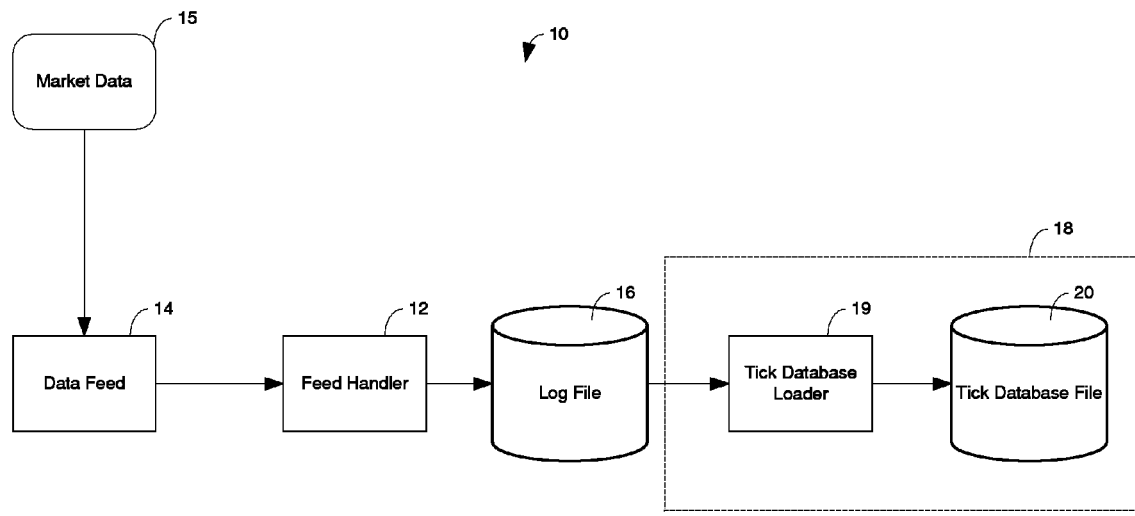
FIGS. 1-2 shows a market data storage system according to various embodiments of the present invention.

With reference to FIG. 1, a market data storage system 10 is shown in accordance with various embodiments of the present invention. A feed handler 12 may receive data feed 14. The feed handler 12 may comprise a programmed computer device or system used to facilitate an interface between the various data feeds, and data sources and the down stream components of the market data storage system 10. The data feed 14 may be comprised of market data 15. The data feed 14 may receive raw data from various sources, such as vendor feeds, direct connection to exchanges, or market makers. The feed handler 12 may create a log file 16 from the data feed 14. As understood by those skilled in the art, the feed handler 12 may receive data from a plurality of data feeds or other sources. In various embodiments, a tick database loader 19 may import the data from the log file 16 and store it in a tick database file 20 for long term storage. In some implementations, various components may be added, deleted, modified, or combined. For example, the feed handler 12 may be configured to provide information directly to the tick database file 20.

Figure 2:
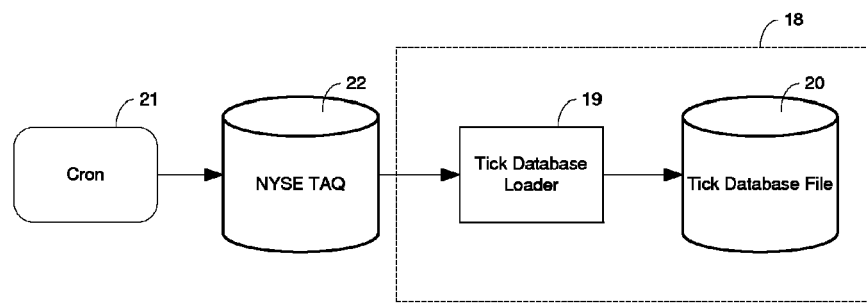

Referring now to FIG. 2, an embodiment utilizing New York Stock Exchange (NYSE) Trade and Quote (TAQ) data is illustrated. A cron 21 may routinely download data from a data source, such as the NYSE. The data may be downloaded or received from any suitable source, such as file transfer protocol (FTP) or a DVD, for example. In various embodiments, the data may be in any suitable format, such as NYSE TAQ data file formats or comma separate value (CSV) format, for example. As understood by those skilled in the art, a cron is generally an automated process that operates at predefined time intervals. A NYSE TAQ file 22 may be created to hold the downloaded data. The tick database loader 19 may then import the data files into the tick database file 20. As may be appreciated by those skilled in the art, some files downloaded from exchanges, such as the NYSE, may be in a compressed file format, such as a ZIP file format. As understood by those skilled in the art, the NYSE TAQ files 22 may also be available in DVD format. In various embodiments, those compressed files can be decompressed before processing by the tick database 18.

In various embodiments, the tick database file 20 may be a multi-session, write-once database. The database file 20 may be stored in any suitable medium, such as an optical disk drive, a CDROM, or a DVD, for example. In various embodiments, data may be stored in the tick database file 20 and additional data may be appended to the existing file, but the data in the tick database file 20 may not typically be modified after it is stored. In various embodiments, the multi-session, write-once database allows a large number of database engines to query the tick database file 20 concurrently without requiring concurrent access control mechanisms during data retrieval, such as record locking or other transactions controls.

Figure 3A:
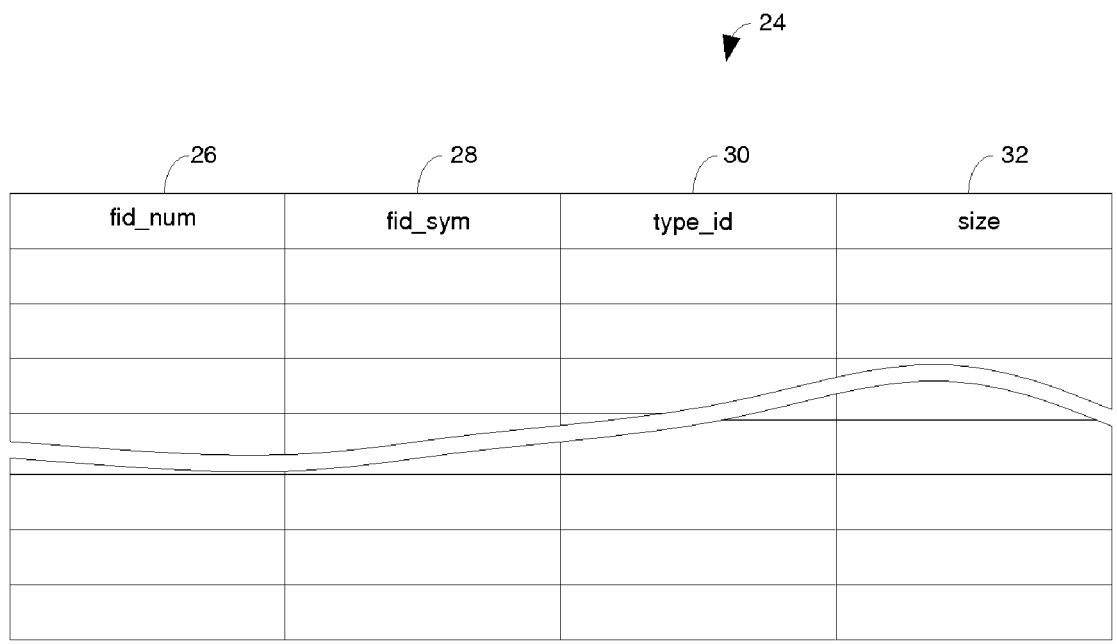
FIG. 3A shows a schema according to various embodiments of the present invention.

Data in the tick database 18 may be stored according to a schema 24 as shown in FIG. 3A. The schema 24 may establish an organized listing of all the data elements that are pertinent to the system. In this regard, the schema 24 may play at least three roles. First, the schema 24 may define the database column definitions as in traditional databases. Next, the schema 24 may be used for encoding ticks into the proper format. Also, the schema 24 may be used for converting ticks from a compact format to a normalized table form. As shown in the illustrated embodiment, the schema 24 may be a table or array with columns for a fid_num 26, a fid_sym 28, a type_id 30, and a size 32. In some embodiments a description column may also be included. An example schema is illustrated in FIG. 3B. FIG. 3C provides sample definitions for the type_id column of FIG. 3B. As appreciated by those skilled in the art, the schema 24 may comprise additional rows or columns to further define the schema. Additionally, other symbols, notations, or terminologies may be used in various embodiments.

In various embodiments, additional database columns to store data may be added at any time after the tick database file 20 has been created. Columns may be added without affecting the validity of the data previously stored and without the need to reorganize or reload the tick database file 20. In order to add additional information, or columns, regarding transactions the schema 24 may be updated to reflect the additional type of data. When a new entry is added to the schema 24, the new identifier in fid_num 26 may be assigned sequentially, and new fields may be appended to schema 24. In various embodiments, similar to traditional SQL tables, each entry (or identifier) in the fid_sym 28 column may be unique. Upon data retrieval, newly added fields may be populated with NULL values if no data was previously stored in the field for any particular transaction or market event. As understood by those skilled in the art, the entries in the fid_sym 28 column may be renamed at a later time. In various embodiments, the entries associated with the fid_num 26 column, the type_id 30 column, and the size 32 column may not be altered after they are defined.

Figure 4:
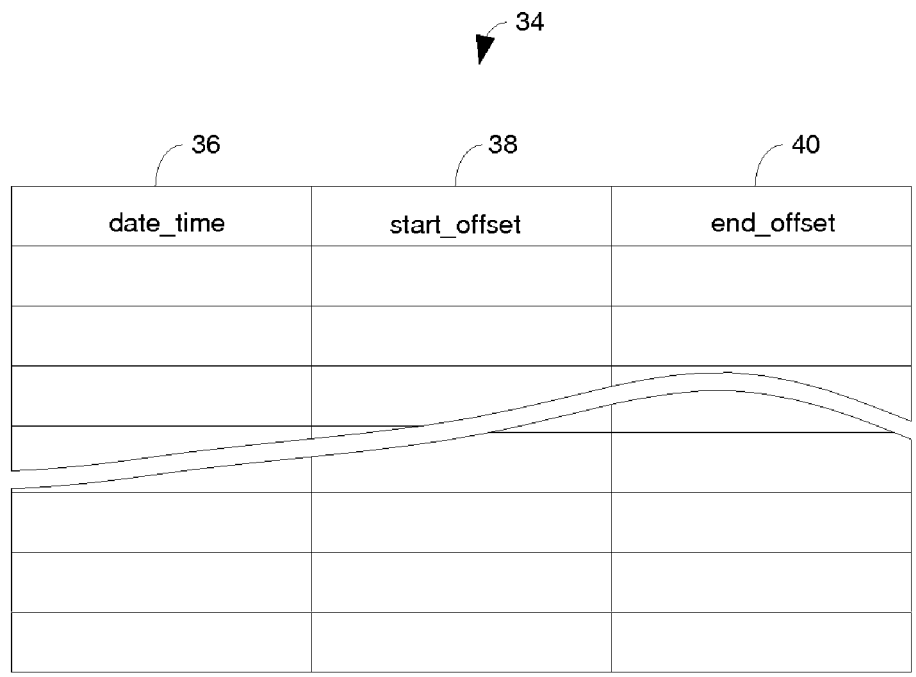
FIG. 4 shows a date table according to various embodiments of the present invention.

The tick database 18 may also comprise a three-part hierarchal key comprising: a date table 34, an exchange table 42, and a ticker table 50. An example embodiment of the date table 34 is illustrated in FIG. 4. The date table 34 may comprise a column for a date_time 36, a start_offset 38, and an end_offset 40. As understood by those skilled in the art, the date table 34 may also comprise additional columns to provide additional information. Furthermore, various embodiments may utilize fewer columns in the date table 34. For example, the end_offset 40 column may not be used. In the illustrated embodiment, the start_offset and end_offset values for a particular data may provide the range of memory locations in the database for tick data grouped by date. In various embodiments, the end_offset value may not be used. For example, as market data is sequentially stored into memory, as discussed in more detail below, the date table 34 tracks the beginning memory location (start_offset) and ending memory location (end_offset) for ticks storing information related to trades for a particular date. That way, all the trade data from different exchanges for a particular day may be grouped together.

Figure 5:
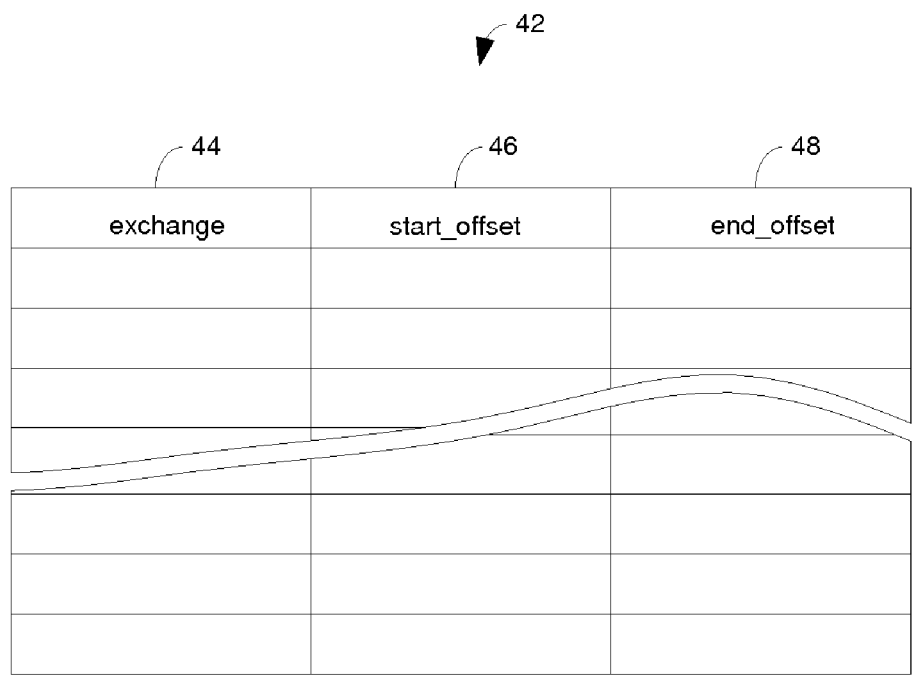
FIG. 5 shows an exchange table according to various embodiments of the present invention.

The tick database 18 may also comprise a number of exchange tables 42, an example of which is illustrated in FIG. 5. The exchange tables 42 may comprise a column for an exchange 44, a start_offset 46, and an end_offset 48. As understood by those skilled in the art, the exchange table 42 may also comprise additional columns to provide additional information. For example, information related to exchange holidays, or outages that may have occurred affected the exchange on a trading day may be stored in the exchange tables 42. Furthermore, various embodiments may utilize fewer columns in the exchange tables 42. For example, the end_offset 48 column may not be used. In the illustrated embodiment, the exchange table 42 provides the memory locations in the database for tick data grouped by exchange. There may be one exchange table 42 for each date identified on date table 34. For example, as market data for an exchange (such as the NYSE, the NASDAQ, or the Tokyo Stock Exchange) is sequentially stored into memory, the exchange table 34 tracks the beginning memory location (start_offset) and ending memory location (end_offset) for the trade data for the particular exchange for the particular date. That way, the data can be grouped by exchange and by date.

Figures 6, 7:
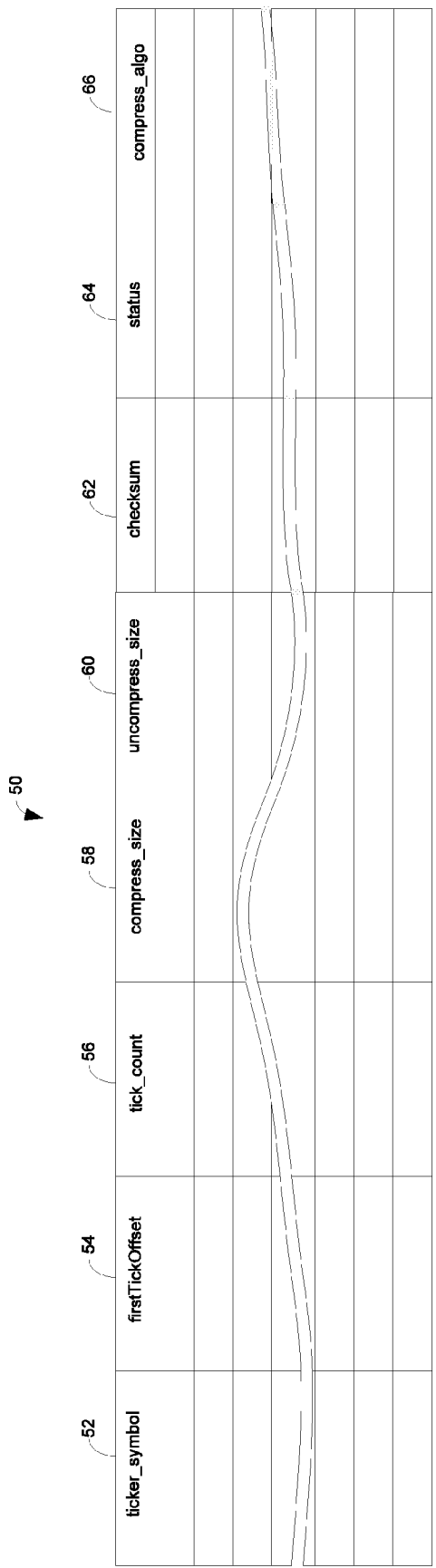
FIG. 6 shows a ticker table according to various embodiments of the present invention.
FIG. 7 shows a table of status codes according to various embodiments of the present invention.

In addition, the tick database 18 may comprise a number of ticker tables 50, an example of which is illustrated in FIG. 6. In various embodiments, the ticker table 50 may comprise a column for a ticker_symbol 52, a firstTickOffset 54, a tick_count 56, a compress_size 58, an uncompr_size 60, a checksum 62, a status 64, and a compression_algo column 66. In the illustrated embodiment, ticker_symbol column 52 may be populated with various ticker symbols, the firstTickOffset column 54 may be populated with memory locations for the associated ticker symbol, the tick_count column 56 may be populated with the total number of ticks associated with the ticker symbol, the compress_size column 58 may be populated with the storage size of the tick after it has been compressed, the uncompr_size column 60 may be populated with the size of the data segment after it has been uncompressed, the checksum column 62 may be populated with a value to check the data integrity, the status column 64 may be populated with a status code denoting the quality of the data being stored, and the compression_algo column 66 may be populated with the type of compression algorithm used to compress the data. Any suitable algorithm may be used to calculate the checksum. For example, various embodiments may use the crc32 or the adler32 algorithm. The status column 64 may include status codes such as "DB_STAT_SUSPECT" (if a technical outage occurred from the data feed 14 affecting the exchange) or may include "DB_STAT_INVALIDATED" if severe errors were found. Any suitable status code (such as "OK", "CLEAR", or "PARTIAL") can be used in status column 64 to represent the quality of the data. A sample table of status codes is provided in FIG. 7.

As understood by those skilled in the art, the ticker table 50 may also comprise additional columns to provide additional information. In the illustrated embodiment, the ticker table 50 provides the memory locations in the database for tick data grouped by ticker symbol. There may be one ticker table 50 for each exchange table 42. That way, the data can be grouped by symbol, by exchange, and by date. The ticker table 50 as illustrated also includes other information regarding the various ticker symbols, such as the compressed size of the data, the uncompressed size of the data, and the compression algorithm utilized.

Figure 8:
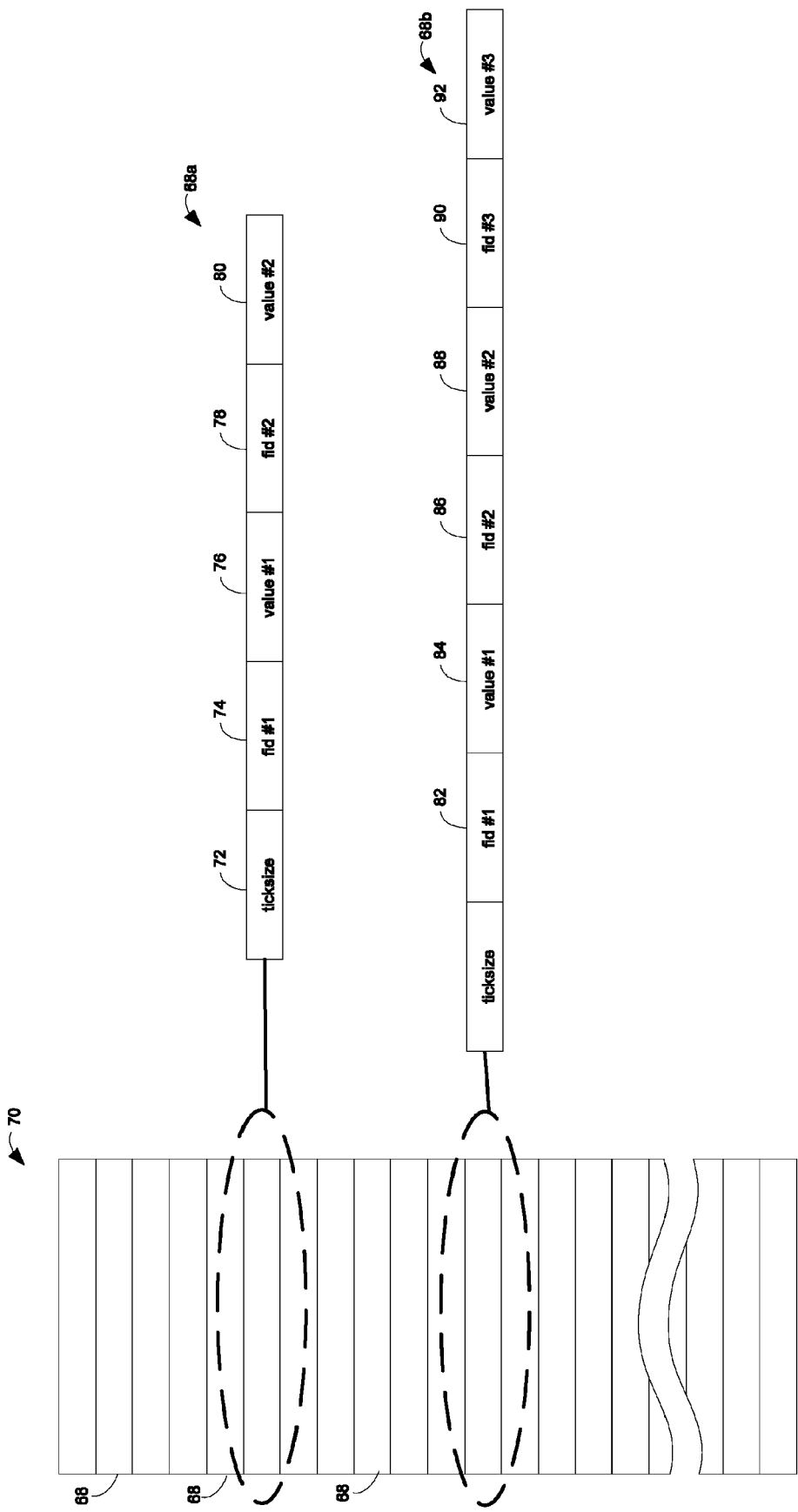
FIG. 8 shows a tick stack according to various embodiments of the present invention.

In various embodiments, the market data for an individual transaction may be stored in a discrete tick 68, as shown in FIG. 8. A plurality of ticks 68 for a particular ticker symbol may be stored in a tick stack 70. As may be appreciated by those skilled in the art, the tick stack 70 may be configured in any suitable configuration for storing the required data. Since the amount of data stored in each tick is dependent on the amount of the information available regarding any particular market transaction, each individual tick 68 may have a variable number of fields and, hence, a variable size. The ticks 68 may comprise a plurality of fields which may be populated based on market data from the tick database loader 19 (FIGS. 1 and 2). For example, there may be three types of fields in a tick: a ticksize field 72, a field identifier field, and a value field. The ticksize field 72 may be the first field in each tick 68. The ticksize field 72 may hold information related to the memory size for that particular tick, such as the number of bytes required for storing that particular tick. In various embodiments, each tick 68 has one and only one ticksize field 72, and it is the first field in the tick 68. The ticksize field 72 may be used for navigating from one individual tick 68 to the next individual tick by adding the current firstTickOffset 54 value (which may be a memory address) with the value in the ticksize field 72 to obtain the memory address for the next sequential tick stored in memory.

In such an embodiment, the remainder of the tick 68 comprises a number of field identifier fields. The field identifier field may identify a particular metric or parameter for the transaction, and the associated value field may provide the corresponding value for that metric or parameter. As such, there may be one and only one value field for each field identifier field. Depending on the available data for a particular market event or transaction there may be a number of field identifier fields and value fields. As illustrated by tick 68a, a first field identifier 74 may be stored in the tick, such as fid #1. The identifier used may be one established by the schema 24 (FIG. 3). The first field identifier 74 may describe the data stored in the first value field 76 stored in the tick 68a. As illustrated, a second field identifier 78 may be stored in the tick, such as fid #2. The second field identifier 78 may describe the data stored in the second value field 80 stored in the tick 68a.

The size of the tick 68, or the value in ticksize field 72, of the tick will vary depending on the information available regarding the transaction. As illustrated by tick 68b, if more information is available, the tick may be populated with the additional information. A first field identifier 82 may be stored in the tick, such as fid #1. The first field identifier 82 may describe the data in the first value field 84 stored in the tick 68b. As illustrated, a second field identifier 86 may be stored in the tick, such as fid #2. The second field identifier 86 may describe the data in the second value field 88 stored in the tick 68*a*. A third field identifier 90 may be stored in the tick, such as fid #3. The third field identifier 86 may describe the data in the third value field 88 stored in the tick 68*a*. As may be appreciated by those skilled in the art, the tick may have a multitude of field identifiers and associated values. In some implementations, an individual tick 68 or row in the tick stack 70 may include up to 65536 fields, which may correspond with the number of entries supported by the schema 24. The number of field identifiers and associated values used for any particular tick may be dependent on the amount of information available for the particular transaction associated with the tick. If a value is not available for any field identifier, the tick does not include that field identifier. Therefore, in such embodiments, null values do not take up any storage space.

Figure 9A:
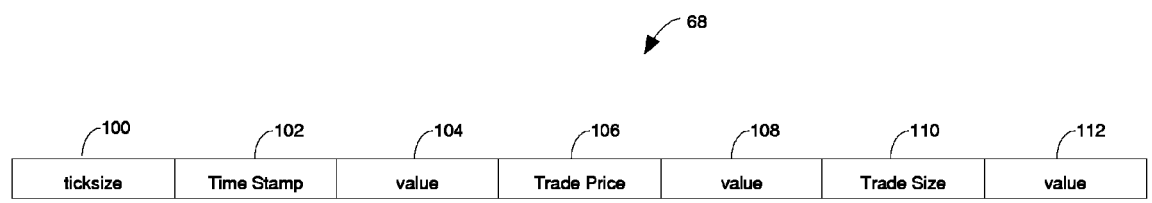
FIGS. 9A-9B shows a tick populated with data according to various embodiments of the present invention.
Figure 9B:
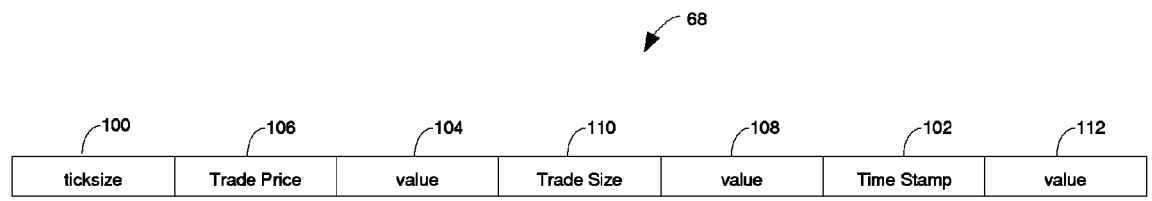

In various embodiments, the relative orders of the various fields or columns as they arrive from the data feed 14 (FIG. 1) may not necessarily be preserved when loaded into the individual ticks 68. For example, if the data comes in to the system with a time stamp data, trade size data, and a trade price data, the tick 68 may be populated with that data in a different relative order. As illustrated by FIG. 9A, the tick 68 is shown populated with the available data. The first column may include a ticksize 100, the second column may include a time stamp field identifier 102, the third column make include a time stamp value 104, the fourth column may include a trade price field identifier 106, the fifth column may include trade price value 108, the sixth column may include a trade size field identifier 110, and the seventh column make include trade size value 112. As illustrated by FIG. 9B, the tick 68 could also be populated in a different order. For example, the first column may include a ticksize 100, the sixth column may include a time stamp field identifier 102, the seventh column make include a time stamp value 104, the second column may include a trade price field identifier 106, the third column make include trade price value 108, the fourth column may include a trade size field identifier 110, and the fifth column make include trade size value 112. As may be appreciated by those skilled in the art, due to the use of the field identifiers, the market data regarding any investment vehicles may be arranged in the tick 68 in any order.

In various embodiments, each tick stores information regarding a discrete market transaction. As each sequential transaction is loaded into the database, the next available tick is sequentially populated with the available information. As the tick data is loaded into the tick stack 70, the date table (FIG. 4) may be populated with the relevant tick offset information for a given time period. The beginning tick offset number (or memory location) is populated along with the ending tick offset number. The exchange table (FIG. 5) may also be populated with the relevant tick offset information for a given exchange. The ticker table (FIG. 6) may be populated with the tick offset number for a particular symbol along with additional information.

Figure 10:
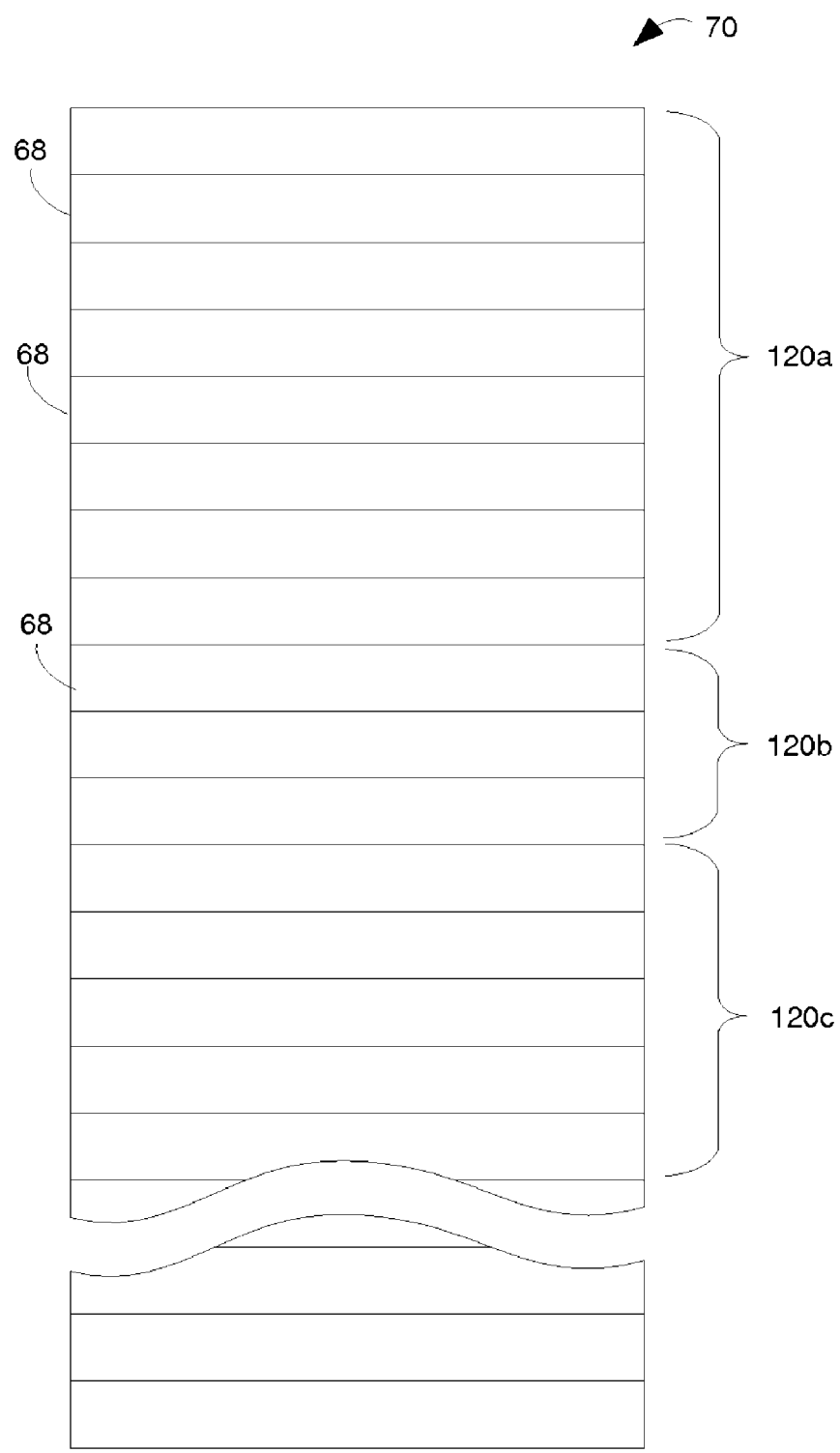
FIG. 10 shows a tick stack with tick buckets according to various embodiments of the present invention.

In some implementations, the data regarding the transactions or trades regarding a particular symbol or investment vehicle for one day is stored sequentially in the tick stack 70. As illustrated in FIG. 10, the tick stack may comprise tick buckets 120*a-c*. Each tick bucket 120*a-c* may be the sequential data for a particular symbol on a particular exchange for a particular day of trading. Furthermore, in various embodiments, the data stored in the tick stack 70 may be stored in compressed form to conserve disk storage space. In some embodiments, a "zlib" compression technique may be used. It is understood, however, that any suitable compression technique may be utilized when storing the market data. Additionally, the algorithm for generating the value in the checksum column 62 may be updated, as well as the entries in status column 64.

A "time stamp" may be one of the fields populated with data in the tick. Transactions having identical time stamps and identical fields may be loaded into the tick database in their original arrival time sequence. Ticks can be uniquely identified since they are grouped together by trading day, exchange, and ticker symbol and ticks for a given ticker symbol are grouped together and stored sequentially in their original arrival order. Therefore, a unique key or identifier (such as a unique time stamp) for each tick (or row) in the database table is not needed.

Figure 11:
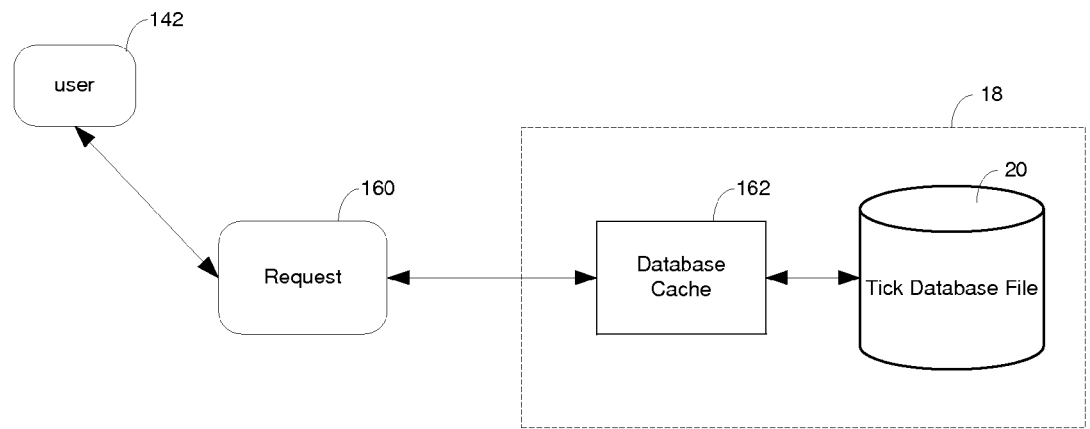
FIG. 11 shows a market data storage system according to various embodiments of the present invention.

As illustrated in FIG. 11, a user 142 may retrieve data from the tick database 18 with a request 160. In various embodiments, the request 160 may utilize the previously mentioned three-part key. For example, the request 160 may include (1) a date/time, (2) an exchange, and/or (3) a ticker symbol. Using the various tables in the tick database the information can be retrieved. The tables provide the tick offsets, or range of tick offsets, relevant to the query. To retrieve various types of information, the request may utilize fewer than all of the keys. For example, a request may only include a date, which would return all tick data for that particular day. A request could identify only a date range, which would return all tick data for that date range. Additionally, a request could include, for example, an exchange (such as NYSE) and a date (such as Aug. 1, 2000), which would return all of the tick data for the NYSE from Aug. 1, 2000 would be retrieved. Furthermore, a request could include all ticks for a given stock symbol on a given day regardless of the exchange it was traded. Results for such a request can be generated efficiently through the use of the three-part hierarchal key without expensive table joining operations required by relational database systems.

In various embodiments, the data retrieval process may cache database metadata information, such as the three-part hierarchal key comprising the ticker table 50, the date table 34, and the exchange table 42, in memory for fast access in a cache 162 (FIG. 10). The ticker table 50 may also be cached during the data retrieval process. The cache 162 may be created with any suitable storage medium, such as Dynamic Random Access Memory (DRAM). When the tick database file 20 first accessed, the date table 34 may be read from the disk and stored in the cache, then the exchange table 42 will be search and cached, and then the ticker table 50 will be searched and cached. When ticks for a given symbol are retrieved from the tick stack 70 for the first time, the tick stack 70 and the schema table 24 may be cached. As appreciated by those skilled in the art, subsequent queries for ticker symbols, or other instruments, with its intermediate metadata cached (i.e., its three-part key) may require as little as one disk operation to retrieve the data from the tick stack 70 using the firstTickOffset 54. Furthermore, the tick stack 70 and metadata information, such as the three-party key and the schema table 24, may be implemented as reference counted objects. These reference counted objects may be cached in DRAM as long as needed and may then be freed as soon as their reference counters become zero.

In various embodiments, the data retrieval process may support a traditional relational database view and an array (vector) structure view. In a traditional relational database view the data may be presented in a normalized table (as if it were a SQL table) with the data organized as rows and columns. The data may be organized as row-major; with each row containing some of all of the fields (columns) defined in the schema 24. In some embodiments, the unused fields or columns may be populated with a null value upon retrieval in order to provide a normalized table. In an array (vector) structure view, the data may be presented as column-major, with each column stored as a vector or array. In some embodiments, a generic tick data object, such as a tickbucket 120a-c, or an individual tick 68 may be retrieved. As understood by those skilled in the art, tickbuckets 120a-c may be implemented as reference counted memory map objects. Each memory mapped tick stack object may be cached and held in DRAM as long as needed, and may be freed as soon as the freed as soon as their reference count becomes zero.

Figure 12:
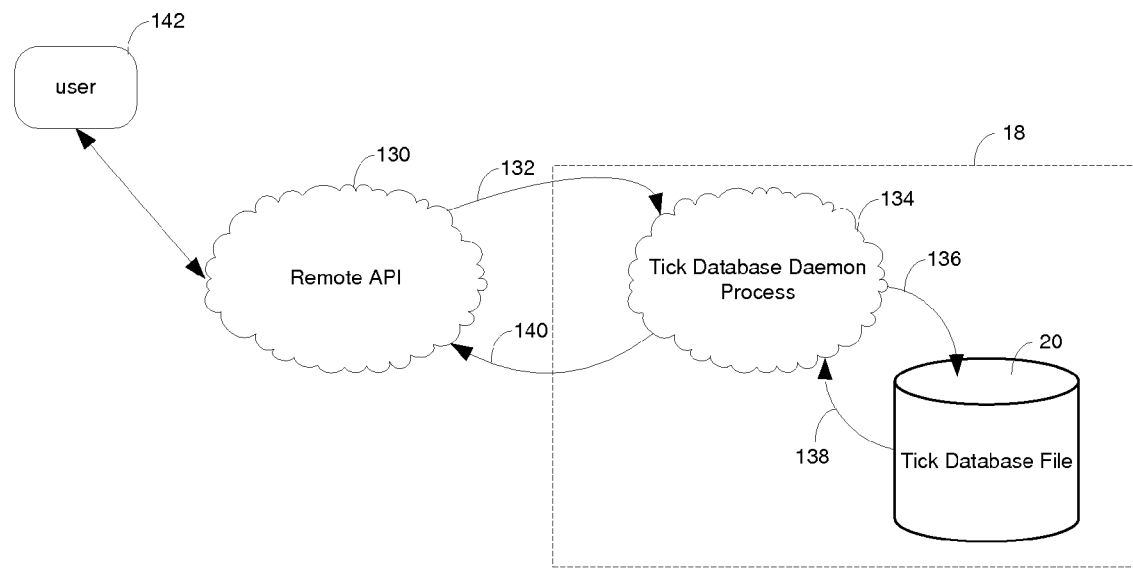
FIG. 12 shows a computer network according to various embodiments of the present invention.

As illustrated in FIG. 12, various embodiments may allow a remote user 142 to access the tick database 18 via a network. As appreciated by those skilled in the art, any suitable network may be utilized, such as a local area network (LAN), wireless network, wireline network, internet, or intranet connection. In various embodiments a remote Application Programming Interface (API) 130 may send a request 132 to the tick database daemon process 134. The request 132 may utilize the three-part key. The tick database daemon process 134 may retrieve the requested information from the tick database file 20 and deliver the data to the API 130 via a return feed 140. In various embodiments, the data retrieved by the tick database daemon process 134 will be in the original compressed format from the tick stack 70 (i.e., tick bucket 120a). The tick database daemon process 134 may then send the compressed data to the API 130 via a return feed 140. The API may then uncompress the data and deliver it to the user 142 in the form of a normalized table or as a vector table. Furthermore, delta changes to the database 20 may be replicated to a remote server using this remote API mechanism.

In various embodiments the tick database file 20 may be located on a network file system, such as a Network File System (NFS), or an Andrew Filing System (AFS), allowing for sharing among a group of machines. Machines sharing the database 20 may be on different architectures. For example, some machines may be PCs, Intel/AMD x86_64 servers, SPARC servers, and/or PowerPC servers. Furthermore, the tick database file 20 may reside on storage area network (SAN) or a local disk drive for high speed data retrieval.

Using the data stored in the tick stack 70, various historical calculations may also be performed. For example, a variety of daily calculations may be computed such as 3, 5, 50, 200-day, 50, 200-week moving averages; 5, 21-day Bollinger bands; 10, 21, 63, 128-day close-close volatilities; 21, 63, 128-day high-low-open-close volatilities; 20, 90, 180-day average daily volumes; 5, 21-day median daily volumes, 5-day time weighted spreads; 8-day relative strength indicators; back test trading strategies; research; analysis; and/or used for legal and compliance purposes. As appreciated by those skilled in the art, any other historical calculation may also be performed using the stored market data.

As used herein, a "computer" or "computer system" may be, for example and without limitation, either alone or in combination, a personal computer ("PC"), server-based computer, main frame, server, grid computer, microcomputer, minicomputer, laptop, personal data assistant ("PDA"), cellular phone, processor, including wireless and/or wireless varieties thereof, and/or any other computerized device capable of configuration for receiving, storing, and/or processing data for standalone applications and/or over the networked medium or media.

In general, computer-readable memory media applied in association with embodiments of the invention described herein may include any memory medium capable of storing instructions executed by a programmable apparatus. Where applicable, method steps described herein may be embodied or executed as instructions stored on a computer-readable memory medium or memory media. These instructions may be software embodied in various programming languages such as C++, C, Java, and/or a variety of other kinds of computer programming languages that may be applied to create instructions in accordance with embodiments of the invention. As used herein, the terms "module" and "engine" represent software to be executed by a processor of the computer system. The software may be stored in a memory medium.

The tick database 18, or any of its associated components or modules, may include operatively associated computer-readable media such as memory for storing software applications used in obtaining, processing, storing, and/or communicating data. It can be appreciated that such memory can be internal, external, remote, or local with respect to its operatively associated computer or computer system. Memory may also include any means for storing software or other instructions including, for example and without limitation, a hard disk, solid state disk, optical disk, floppy disk, DVD, compact disc, memory stick, ROM (read only memory), RAM (random access memory), PROM (programmable ROM), EEPROM (electrically erasable PROM), and/or other like computer-readable media.

The examples presented herein are intended to illustrate potential and specific implementations of the embodiments. It can be appreciated that the examples are intended primarily for purposes of illustration for those skilled in the art. No particular aspect or aspects of the examples is/are intended to limit the scope of the described embodiments.

The processes associated with the present embodiments may be executed by programmable equipment, such as computers or computer systems and/or processors. Software that may cause programmable equipment to execute processes may be stored in any storage device, such as, for example, a computer system (nonvolatile) memory, an optical disk, magnetic tape, magnetic disk, or solid state disk. Furthermore, at least some of the processes may be programmed when the computer system is manufactured or stored on various types of computer-readable media.

While several embodiments of the invention have been described, it should be apparent, however, that various modifications, alterations and adaptations to those embodiments may occur to persons skilled in the art with the attainment of some or all of the advantages of the present invention. It is therefore intended to cover all such modifications, alterations, and adaptations without departing from the scope and spirit of the present invention as defined by the appended claims.

What is claimed is:

1. A tick database system for storing and retrieving market data, the system comprising:
  one or more computers and operatively associated computer-readable media configured to:
    receive and store, according to a schema, market data comprising data regarding individual transactions for investment instruments;
    wherein the schema enables at least database column definitions including field identifiers, data type identifiers and corresponding field size indicators;
    wherein the received data regarding individual transactions is, for each transaction, stored as a discrete tick comprising a plurality of fields including at least (i) a ticksize field where the data in the ticksize field indicates a data size of the discrete tick; and (ii) one or more field pairs comprising field identifier fields and value fields; wherein the data in the field identifier field indicates a particular field identifier and the data in the value field indicates an associated value; wherein the data size of the discrete tick varies based on the received market data for the corresponding discrete tick; and wherein if a value is not available for a particular field identifier, the discrete tick does not include that particular field identifier.

2. The tick database system of claim 1, wherein market data is retrieved using at least a three-part hierarchal key.

3. The tick database system of claim 2, further comprising a date table, the date table providing memory locations for transactions grouped by date.

4. The tick database system of claim 3, further comprising an exchange table, the exchange table providing memory locations for transactions grouped by exchange.

5. The tick database system of claim 4, further comprising a ticker table, the ticker table providing memory locations for transactions grouped by ticker symbols.

6. The tick database system of claim 5, wherein a request to retrieve market data stored in the tick database system specifies at least one of a date, an exchange, and a ticker symbol, and data retrieval is based on at least one of the date table, the exchange table, and the ticker table.

7. The tick database system of claim 6, wherein a plurality of discrete ticks for a particular ticker symbol are stored in a tick stack, the tick stack comprised of a plurality of individual variably sized ticks.

8. The tick database system of claim 7, wherein transactions involving the same investment instrument are stored in sequential ticks.

9. The tick database system of claim 8, wherein the tick stack is stored in a compressed file format.

10. The tick database system of claim 6, wherein a request to retrieve market data stored in the tick database system using the three-part hierarchal key specifies at least one of the date, the exchange, and the ticker symbol, and data retrieval is based on at least one of the date table, the exchange table, and the ticker table.

11. The tick database system of claim 10, wherein, when a request using the three-part hierarchal key specifies less than the date, the exchange, and the ticker symbol, relevant market data stored in the tick database is retrieved based only on the specified keys without limiting the retrieved market data by the one or more unspecified keys.

12. The tick database system of claim 1, wherein the one or more computers and operatively associated computer-readable media are further configured to:
enable one or more new database column definitions, each associated with a new field identifier, to be added to the schema without affecting the validity of previously stored market data; and
wherein upon retrieval of market data associated with a particular transaction, the newly added fields corresponding to the new one or more new database column definitions are populated by null values when no data was previously stored corresponding to the one or more new database column definitions.

13. The tick database system of claim 1, wherein the one or more computers and operatively associated computer-readable media are further configured to:
retrieve stored data in response to a retrieval request and present retrieved data as a normalized table organized as rows and columns, wherein unused columns are populated with null values upon retrieval in order to provide the normalized table.

14. The tick database system of claim 1, wherein the schema further enables at least (a) encoding the received market data to be stored; and (b) converting retrieved market data to a normalized table format.

15. The tick database system of claim 1, wherein the data size of the discrete tick varies based at least on a number of field pairs in each discrete tick.

16. The tick database system of claim 15, wherein the data size of the discrete tick varies further based at least on particular data types of field pairs in each discrete tick.

17. The tick database system of claim 1, wherein the discrete tick is stored in a tick stack comprising a plurality of discrete ticks each associated with a particular investment instrument.

18. The tick database system of claim 1, wherein the data regarding individual transactions comprises at least one of (a) data regarding trade transactions including one or more of time stamp data, trade size data, trade price data and trade condition code data, and (b) data regarding quote transactions including one or more of bid price data, ask price data, bid size data and ask size data.

19. The tick database system of claim 1, comprising a tick database file comprising a write-once database.

20. The tick database system of 19, wherein the tick database file further comprises a multi-session, write-once database.

21. The tick database system of claim 1, wherein the one or more computers and operatively associated computer-readable media are further configured to implement a multi-session, write-once computer database that stores the market data; wherein the database comprises a date table, an exchange table, and a ticker table, and wherein the database comprises a tick stack, the tick stack comprised of a plurality of individual variably sized ticks.

22. A tick database system of claim 1, wherein specified market data is retrievable in response to a first request using a memory location; and wherein the one or more computers and operatively associated computer-readable media are further configured to implement:
a cache configured to temporarily store retrieved specified market data for subsequent retrieval by a second request;
a multi-session, write-once database that stores the market data, wherein the database comprises a date table, an exchange table, and a ticker table populated with memory locations; and
one or more daemon processes to retrieve market data from the database in response to a database search request.

23. The tick database system of claim 22, wherein:
the one or more computers and operatively associated computer-readable media are further configured to implement: the daemon process sending the market data retrieved from the database, in response to the database search request to a remote computer system in a compressed format, and wherein changes to the database are replicated to the remote computer system.

24. A computer implemented method for storing and retrieving market data that when executed by a computer performs the steps comprising:
receiving market data comprising data regarding individual transactions for investment instruments;
storing, according to a schema, the market data; wherein the schema enables at least database column definitions including field identifiers, data type identifiers and corresponding field size indicators; wherein the received data regarding individual transactions is, for each transaction, stored as a discrete tick comprising a plurality of fields including at least (i) a ticksize field where the data in the ticksize field indicates a data size of the discrete tick; and (ii) one or more field pairs comprising field identifier fields and value fields; wherein the data in the field identifier field indicates a particular field identifier and the data in the value field indicates an associated value; wherein the data size of the discrete tick varies based on the received market data for the corresponding discrete tick; and wherein if a value is not available for a particular field identifier, the discrete tick does not include that particular field identifier.

25. The method of claim 24, further comprising:
importing, by a tick database loader, market data from a log file.

26. The method of claim 25, further comprising:
retrieving market data regarding individual transactions using at least a three-part hierarchal key.

27. The method of claim 26, further comprising performing historical calculations using the retrieved data.

28. The method of claim 24, further comprising:
querying a tick database file, by a plurality of database engines, concurrently without requiring access control mechanisms during data retrieval.

29. The method of claim 24, further comprising:
populating a date table, an exchange table, and a ticker table with memory locations;
retrieving specified market data using the memory locations in response to a first request;
caching, in a cache, (i) the retrieved specified market data, and (ii) the date table, the exchange table, the ticker table and the schema; and
retrieving the specified market data from the cache in response to a second request.

30. A non-transitory computer readable medium having instructions stored thereon which when executed by a processor cause the processor to:
receive and store, according to a schema, market data comprising data regarding individual transactions for investment instruments; wherein the schema enables at least database column definitions including field identifiers, data type identifiers and corresponding field size indicators; wherein the received data regarding individual transactions is, for each transaction, stored as a discrete tick comprising a plurality of fields including at least (i) a ticksize field where the data in the ticksize field indicates a data size of the discrete tick; and (ii) one or more field pairs comprising field identifier fields and value fields; wherein the data in the field identifier field indicates a particular field identifier and the data in the value field indicates an associated value; wherein the data size of the discrete tick varies based on the received market data for the corresponding discrete tick; and wherein if a value is not available for a particular field identifier, the discrete tick does not include that particular field identifier.

* * * * *